United States Patent
Hirasawa et al.

(10) Patent No.: US 10,988,853 B2
(45) Date of Patent: Apr. 27, 2021

(54) STAINLESS STEEL SHEET INCLUDING NI AND O-CONTAINING COATING ON SURFACE AND METHOD FOR PRODUCING STAINLESS STEEL SHEET

(71) Applicant: JFE Steel Corporation, Tokyo (JP)

(72) Inventors: Junichiro Hirasawa, Tokyo (JP); Shin Ishikawa, Tokyo (JP); Chikara Kami, Tokyo (JP); Shinji Ootsuka, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 261 days.

(21) Appl. No.: 16/069,094

(22) PCT Filed: Jan. 5, 2017

(86) PCT No.: PCT/JP2017/000066
§ 371 (c)(1),
(2) Date: Jul. 10, 2018

(87) PCT Pub. No.: WO2017/122560
PCT Pub. Date: Jul. 20, 2017

(65) Prior Publication Data
US 2019/0032236 A1  Jan. 31, 2019

(30) Foreign Application Priority Data
Jan. 12, 2016  (JP) .............................. JP2016-003439

(51) Int. Cl.
*C25D 9/10* (2006.01)
*B23K 35/36* (2006.01)

(52) U.S. Cl.
CPC ............ *C25D 9/10* (2013.01); *B23K 35/3602* (2013.01)

(58) Field of Classification Search
CPC .............................. B23K 35/3602; C25D 9/10
(Continued)

(56) References Cited

U.S. PATENT DOCUMENTS 9,175,414 B2   11/2015  Hoshino et al.
2010/0012697 A1  1/2010  Margaria
(Continued)

FOREIGN PATENT DOCUMENTS

CN  103168116 A  6/2013
CN  104254643 A  12/2014
(Continued)

OTHER PUBLICATIONS

Ma et al., "Hot corrosion of a novel NiO/NiFe2O4 composite coating thermally converted from the electroplated Ni—Fe alloy," Nov. 2011, Corrosion Science, URL: <https://www.sciencedirect.com/science/article/pii/S0010938X11003672#f0005>, pp. 3712-3724 (Year: 2011).*
(Continued)

*Primary Examiner* — Humera N. Sheikh
*Assistant Examiner* — Katherine A Christy
(74) *Attorney, Agent, or Firm* — Ratnerprestia

(57) ABSTRACT

Stainless steel sheets including a Ni and O-containing coating on the surface that has excellent weld penetration characteristics and excellent crevice corrosion resistance, and a method for producing such stainless steel sheets. A stainless steel sheet includes a Ni and O-containing coating on a surface of the stainless steel sheet. The Ni and O-containing coating has a coating weight of greater than or equal to 0.1 g/m² and less than or equal to 20 g/m². The Ni and O-containing coating has a composition including, in at. %, Ni: greater than or equal to 25% and less than or equal to 60%, and O: greater than or equal to 40% and less than or equal to 70%.

14 Claims, 1 Drawing Sheet

(58) Field of Classification Search
USPC .......................................................... 428/702
See application file for complete search history.

(56) References Cited

U.S. PATENT DOCUMENTS

| 2013/0202791 A1 | 8/2013 | Ito et al. | |
|---|---|---|---|
| 2013/0209832 A1* | 8/2013 | Kim | B32B 15/043 428/659 |
| 2017/0130355 A1* | 5/2017 | Iai | C25D 9/06 |

FOREIGN PATENT DOCUMENTS

| EP | 0778362 A2 | 6/1997 |
|---|---|---|
| EP | 2623645 A1 | 8/2013 |
| EP | 2692891 A1 | 2/2014 |
| EP | 2835447 A1 | 2/2015 |
| GB | 1377079 A | 12/1974 |
| JP | 61204393 A | 9/1986 |
| JP | H0386302 A | 4/1991 |
| JP | 09263965 A * | 10/1997 |
| JP | 2000326091 A | 11/2000 |
| JP | 2003003300 A | 1/2003 |
| JP | 2008308763 A | 12/2008 |
| JP | 2011190523 A | 9/2011 |
| JP | 2013065562 A | 4/2013 |
| TW | 201227899 A | 7/2012 |

OTHER PUBLICATIONS

Glazoff et al., "Controlling chromium vaporization from interconnects with nickel coatings in solid oxide devices," Aug. 10, 2014, International Journal of Hydrogen Energy, URL: <https://www.sciencedirect.com/science/article/pii/S0360319914019788#fig1>, pp. 15031-15038 (Year: 2014).*

Osaki et al., JP 09263965 A machine translation, Dec. 4, 2000, entire document (Year: 2000).*

Korean Notice of Allowance Korean Application No. 10-2018-7019240 dated Feb. 4, 2020 with translation, 2 pages.

Taiwanese Office Action for Taiwanese Application No. 106 100 974, with Concise Statement of Relevance of Office Action, dated Jul. 26, 2017—5 pages.

Chinese Office Action for Chinese Application No. 201780006560.X, dated Jun. 13, 2019, with Search Report—8 pages.

Extended European Search Report for European Application No. 17 73 8315.5, dated Dec. 11, 2018, 6 pages.

International Search Report and Written Opinion for International Application No. PCT/JP2017/000066, dated Jan. 31, 2017—4 pages.

* cited by examiner

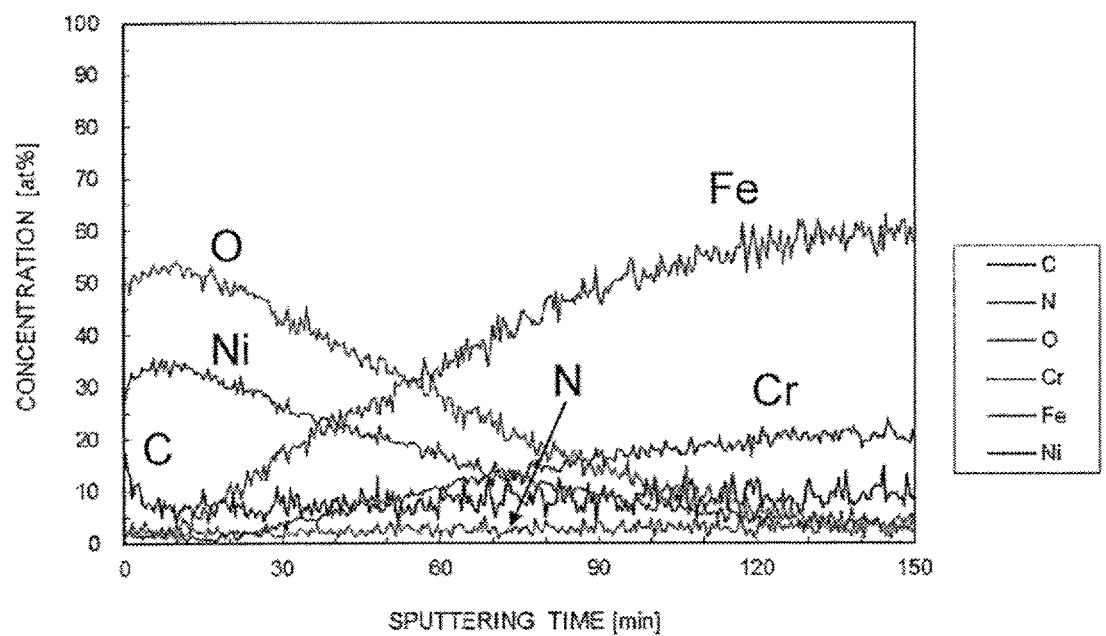

STAINLESS STEEL SHEET INCLUDING NI AND O-CONTAINING COATING ON SURFACE AND METHOD FOR PRODUCING STAINLESS STEEL SHEET

CROSS REFERENCE TO RELATED APPLICATIONS

This is the U.S. National Phase application of PCT/JP2017/000066, filed Jan. 5, 2017, which claims priority to Japanese Patent Application No. 2016-003439, filed Jan. 12, 2016, the disclosures of these applications being incorporated herein by reference in their entireties for all purposes.

TECHNICAL FIELD OF THE INVENTION

The present invention relates to stainless steel sheets including a Ni and O-containing coating on the surface. In particular, the present invention relates to a stainless steel sheet including a Ni and O-containing coating on the surface and having excellent weld penetration characteristics and excellent crevice corrosion resistance.

BACKGROUND OF THE INVENTION

In general, when arc welding, such as TIG welding (tungsten inert gas welding) or MIG welding (metal inert gas welding), is performed on a stainless steel sheet, the stainless steel sheet exhibits low weld penetration characteristics compared with common steel sheets, such as SPCC (steel plate cold commercial). That is, when arc welding is performed on a stainless steel sheet, there is a problem in that the depth of penetration in the steel sheet thickness direction is shallow compared with common steel sheets even when the welding conditions are the same.

Examples of known techniques for improving the weld penetration characteristics include a technique of applying a metal oxide to the portion to be welded in the stainless steel sheet by using a brush or another tool, and a technique of adding a metal oxide to a welding rod or a welding wire. Oxygen, which is present in metal oxides, is a surface-activating element. In welding, with an increase in oxygen in the weld pool, the surface tension of the weld pool changes. This can cause the convection of the weld pool to be directed toward the inside, in other words, cause the molten metal in the high-temperature zone near the center of the arc to be convected from the steel sheet front side toward the steel sheet back side in the steel sheet thickness direction. This results in a greater depth of penetration. For example, Patent Literature 1, listed below, discloses a flux including a Ti oxide, a Si oxide, and a Cr oxide. The flux is applied in advance to a stainless steel sheet prior to TIG welding.

In stainless steel sheets, crevice corrosion is a form of corrosion to which particular attention should be paid and is known to sometimes lead to serious problems. As countermeasures for crevice corrosion, efforts for inhibiting crevice corrosion have been made. Examples of such efforts include adding an appropriate amount of one or more elements that improve corrosion resistance, such as Cr, Ni, Mo, Cu, etc. to a stainless steel sheet.

PTL 1: Japanese Unexamined Patent Application Publication No. 2000-326091

SUMMARY OF THE INVENTION

The flux disclosed in Patent Literature 1, however, does not consider crevice corrosion. There is another problem in that the weld penetration characteristics may vary depending on the composition of the metal oxides. Also, there is another problem in that the weld penetration characteristics may vary because of variations in the amount of the metal oxide applied, particularly when the coating is applied by a human using a brush, a spray, or another tool.

For crevice corrosion, it may be possible to employ the above-mentioned simple technique, that is, addition of an appropriate amount of one or more elements that improve corrosion resistance, such as Cr, Ni, Mo, Cu, etc. to a stainless steel sheet. However, there is a problem in that these elements are rare metals and expensive, and thus, when added, increase the cost of the stainless steel sheet. Accordingly, there is a need for a different technique for improving crevice corrosion resistance, other than the method of simply adding the above-mentioned elements to a stainless steel sheet.

The present invention has been made in view of the above circumstances, and an object of the present invention is to provide a stainless steel sheet including a Ni and O-containing coating on the surface and having excellent weld penetration characteristics and excellent crevice corrosion resistance, and to provide a method for producing such a stainless steel sheet.

To solve the above-described problems associated with weld penetration characteristics and crevice corrosion resistance of stainless steel sheets, the present inventors verified, for example, the improvement effects of metal coatings and metal oxide coatings. As a result, the present inventors found that it is effective to apply, to the surface, a Ni and O-containing coating in an amount of greater than or equal to 0.1 g/m$^2$ and less than or equal to 20 g/m$^2$, the coating having a composition including, in at. %, Ni: greater than or equal to 25% and less than or equal to 60%, and O: greater than or equal to 40% and less than or equal to 70%. The present inventors conducted further studies to accomplish the present invention.

The present inventors suppose that the Ni and O-containing coating improves weld penetration characteristics and crevice corrosion resistance by the following mechanisms. First, as described above, O dissociates in the weld pool and changes the surface tension of the weld pool, which causes the convection of the weld pool to be directed toward the inside. This results in a greater depth of penetration. Further, Ni oxide forms a protective film, which improves crevice corrosion resistance.

Embodiments of the present invention are as follows.

[1] A stainless steel sheet with a Ni and O-containing coating on a surface of the stainless steel sheet, wherein a coating weight of the Ni and O-containing coating is greater than or equal to 0.1 g/m$^2$ and less than or equal to 20 g/m$^2$, and the Ni and O-containing coating has a composition including, in at. %, Ni: greater than or equal to 25% and less than or equal to 60%, and O: greater than or equal to 40% and less than or equal to 70%.

[2] The stainless steel sheet according to [1], the stainless steel sheet including the Ni and O-containing coating on the surface of the stainless steel sheet, wherein the stainless steel sheet is a ferritic stainless steel sheet.

[3] The stainless steel sheet according to [1] or [2], the stainless steel sheet with the Ni and O-containing coating on the surface of the stainless steel sheet, wherein the stainless steel sheet is used in an application in which a gap structure is formed.

[4] A method for producing the stainless steel sheet according to any one of [1] to [3], the stainless steel sheet including the Ni and O-containing coating on the surface of the stainless steel sheet, the method including electrodeposition to form the Ni and O-containing coating on the surface of the stainless steel sheet.

[5] The method according to [4] for producing the stainless steel sheet including the Ni and O-containing coating on the surface of the stainless steel sheet, wherein the electrodeposition is performed by cathode electrolysis in a solution containing nitrate ions and Ni ions.

The embodiments of present invention provide a stainless steel sheet including a Ni and O-containing coating on the surface and having excellent weld penetration characteristics and excellent crevice corrosion resistance. Since the stainless steel sheet is a coated steel sheet, there is no need to apply, prior to welding, a metal oxide to the portion to be welded with a brush or another tool, and thus, the steel sheet as it is exhibits excellent weld penetration characteristics. The use of electrodeposition to form the coating on the stainless steel sheet results in a uniform coating thickness compared with the case in which a coating is applied by a human with a brush, a spray, or another tool. As a result, variations in weld penetration characteristics are prevented. Thus, it is unnecessary to apply an excessive amount of Ni and O-containing material, such as oxides. Consequently, the coating weight can be reduced.

Furthermore, the composition of the coating is in the range according to the present invention. This results in improved crevice corrosion resistance without the need to add, to the stainless steel sheet, one or more elements, such as Cr, Ni, Mo, Cu, etc. or to increase the contents of these elements. Particularly, for gap structures formed by welding of overlapping steel sheets, the operation of applying a metal oxide into the gap structure is difficult in some cases. Thus, the coated steel sheet of the present invention, which has excellent weld penetration characteristics and crevice corrosion resistance, is effective.

The FIGURE is a graph illustrating results of Auger electron spectroscopy of a coating formed on the surface of a stainless steel sheet by electrodeposition. Sputtering was performed from the surface for element analysis in the depth (sheet thickness) direction.

DETAILED DESCRIPTION OF EMBODIMENTS OF THE INVENTION

Embodiments of the present invention, including the best mode, will be described below.

The coating weight of the Ni and O-containing coating, which is applied to the surface of the stainless steel sheet, is greater than or equal to 0.1 g/m$^2$ and less than or equal to 20 g/m$^2$. If the coating weight is less than 0.1 g/m$^2$, the contents of Ni— and O are insufficient. This results in a failure to provide the effect of improving weld penetration characteristics and crevice corrosion resistance. It is preferable that the lower limit of the coating weight be greater than 0.5 g/m$^2$. On the other hand, if the coating weight is greater than 20 g/m$^2$, the adhesion between the coating and the stainless steel sheet deteriorates, which results in a failure to ensure good crevice corrosion resistance. Thus, the upper limit of the coating weight is 20 g/m$^2$. It is preferable that the upper limit of the coating weight be less than or equal to 5 g/m$^2$, and it is more preferable that the upper limit be less than or equal to 3 g/m$^2$. One feature of the Ni and O-containing coating of the present invention is that the coating provides good effect despite the thinness of the coating weight, e.g., greater than or equal to 0.1 g/m$^2$ and less than or equal to 3 g/m$^2$.

In the present invention, the composition of the Ni and O-containing coating is specified in atomic percent. The Ni and O-containing coating, which is applied to the surface of the stainless steel sheet, has a composition including, in at. %, Ni: greater than or equal to 25% and less than or equal to 60%, and O: greater than or equal to 40% and less than or equal to 70%. The Ni— and O contents in the above ranges ensure excellent weld penetration characteristics and excellent crevice corrosion resistance. It is preferable that the lower limit of the Ni content be greater than or equal to 30%. It is preferable that the upper limit of the Ni content be less than or equal to 50%. The Ni and O-containing coating may include one or more elements other than Ni and O (for example, Cr, Zn, Cu, Mg, C, P, etc.). The content of the other elements may be, in at. %, not greater than 30%, preferably not greater than 20%, and more preferably not greater than 15%. It is also possible that the Ni and O-containing coating may be made of only Ni and O.

In the Ni and O-containing coating, the ratio between Ni and O is not particularly limited provided that the above-mentioned composition is satisfied. It is preferable that the atomic ratio be O/Ni=from 1 to 2.

In the present invention, the coating weight of the Ni and O-containing coating is determined by a weighing method. Weighing method: (mass of steel sheet after application of coating–mass of steel sheet before application of coating)/area of applied coating In the present invention, the composition of the Ni and O-containing coating is determined, typically, by Auger electron spectroscopy. More specifically, it is preferable to use the following conditions for Auger electron spectroscopy to determine the composition of the coating. For examples of the present invention, the analyzer used was a PHI-660, manufactured by ULVAC-PHI, Inc.

Auger electron spectroscopy:
(Electron gun conditions) acceleration voltage: 5 kV (SE observation and measurement); sample electrical current quantity: 50 nA
(Sputtering, ion gun conditions) ion species: Ar; acceleration voltage: 3 kV; sputtering rate calculated as SiO$_2$: 3.3 nm/min In the present invention, it is preferable that the Ni and O-containing coating, described above, be provided directly on the surface of the stainless steel sheet. When the coating on the surface of the stainless steel sheet is a multi-layer structure, it is sufficient that one of the multiple layers be the Ni and O-containing coating.

In the present invention, the composition of the stainless steel sheet may be appropriately selected. Examples of stainless steel sheets that may be used herein include austenitic stainless steel sheets, austenitic-ferritic duplex stainless steel sheets, ferritic stainless steel sheets, and martensitic stainless steel sheets. Ferritic stainless steel sheets are preferred. In general, ferritic stainless steel sheets exhibit lower weld penetration characteristics and lower crevice corrosion resistance than those of austenitic stainless steel sheets. However, with the present invention, excellent weld penetration characteristics and excellent crevice corrosion resistance are ensured even with use of a ferritic stainless steel sheet.

As used herein, "stainless steel sheet" refers to a steel sheet containing, in the composition, Cr in an amount ranging from 10.5 to 35.0 mass %. It is preferable that the Cr content in the stainless steel sheet range from 10.5 to 32.0 mass %.

As used herein, "ferritic stainless steel sheet" refers to a stainless steel containing, in the composition, Cr in an amount ranging from 10.5 to 35.0 mass % with a Mn content of less than or equal to 2.0 mass % and a Ni content of less than or equal to 3.0 mass %. In the ferritic stainless steel sheet, it is also preferable that the Cr content range from 10.5 to 32.0 mass %.

Preferred examples of the austenitic stainless steel sheets include SUS304 (18 mass % Cr-8 mass % Ni), SUS304L (18 mass % Cr-9 mass % Ni-low C), SUS316 (18 mass % Cr-12 mass % Ni-2 mass % Mo), and SUS316L (18 mass % Cr-12 mass % Ni-2 mass % Mo-low C).

Preferred examples of the ferritic stainless steel sheets include SUS430 (18 mass % Cr), SUS430J1L (19 mass % Cr-0.5 mass % Cu—Ti/Nb/Zr added-very low C and N), SUS430LX (18 mass % Cr—Ti/Nb added-low C), SUS443J1 (21 mass % Cr-0.4 mass % Cu—Ti/Nb/Zr added-very low C and N), and SUS445J1 (22 mass % Cr-1 mass % Mo—Ti/Nb/Zr added-very low C and N).

As described above, in the present invention, any of a variety of stainless steel sheets may be used.

Next, a preferred production method for the stainless steel sheet including the Ni and O-containing coating on the surface will be described.

It is preferable to use electrodeposition to form the Ni and O-containing coating on the surface of the stainless steel sheet. It is more preferable that the electrodeposition be performed by cathode electrolysis in a solution containing nitrate ions and Ni ions. An example of this is as follows. An aqueous solution of nickel nitrate hexahydrate, having a temperature of 40 to 60° C. and a concentration of 10 to 50 g/l, is adjusted to a pH of 2 to 5 by using sulfuric acid, and electrode plates (anode side and cathode side) are immersed in the solution. The stainless steel sheet, which is to be coated by electrodeposition (by cathode electrolysis), is the cathode electrode. An electrical current of 0.1 to 10 A/dm$^2$ is applied to the solution. In this manner, the Ni and O-containing coating may be obtained. The coating weight of the Ni and O-containing coating can be adjusted in accordance with the magnitude of the electrical current and the duration of electrical current application. Also, by determining in advance the relationship between the amount of electricity (electrical current×time) for electrodeposition and the coating weight determined by a weighing method, the coating weight can be determined by converting the amount of electricity. For the anode electrode, preferred materials include those that are stable even in electrolysis in a low-pH acidic solution and that have a low overvoltage for oxygen evolution. Examples of such a material for the anode electrode include platinum and iridium oxide-coated titanium.

Metal or alloy coatings can be formed by hot dip coating or by another process. However, with hot dip coating or another process, a coating having a high oxygen content cannot be obtained. In contrast, with an electrodeposition process, by appropriately selecting the ion species for the solution and the electrodeposition conditions, oxygen can be included in the coating to form a metal oxide coating. Furthermore, with electrodeposition, the thickness of the coating can be controlled by the amount of electricity, and thus control of the coating weight is easier than with, for example, spray coating or dipping. As a result, high coating uniformity and high stability in mass production are achieved.

In the case where a solution containing nitrate ions and Ni ions is used for electrodeposition, the sources of the nitrate ions and the Ni ions are not particularly limited. By using nickel nitrate, as described above, nitrate ions and Ni ions can be supplied from the nickel nitrate. It is also possible that a nitrate salt and a nickel salt may be used in combination.

Prior to electrodeposition, a process for facilitating electrodeposition (activation treatment) may be performed. In the process, the stainless steel sheet may be dipped in a sulfuric acid aqueous solution to remove the passivation film. It is preferable that the sulfuric acid aqueous solution be a sulfuric acid aqueous solution having, for example, a temperature of 40 to 60° C. and a concentration of 10 to 50 mass %.

FIG. 1 illustrates an example of component analysis in the depth direction of the Ni and O-containing coating, which is obtained by the method described above. The analysis conditions are as in the above description of the Auger electron spectroscopy. It is seen that Ni and O are detected in the coating portion of the surface of the stainless steel sheet. In FIG. 1, the Ni and O-containing coating has a composition including, in at. %, Ni: 34%, and O: 53%.

In the Auger electron spectroscopy, the quantitative analysis of the composition of the coating is performed in such a manner that the total content of the Ni, O, Fe, Cr, C, and N is 100%. The Ni and O contents in the composition of the coating are quantitative values at the position of maximum Ni intensity, which is determined in the depth direction analysis. In cases where the stainless steel includes, for example, Mo or Cu, these elements are also to be quantitatively analyzed by Auger electron spectroscopy. FIG. 1 shows that the concentrations of Ni and O vary in the depth direction, and the main reasons for this are as follows. In the surface layer, a large amount of adsorbed C is detected. The thickness of the Ni and O-containing coating, when observed microscopically, is non-uniform. The surface of the base stainless steel sheet is not smooth.

The stainless steel sheet according to the present invention, which includes the Ni and O-containing coating on the surface, can be used in any of a variety of applications. The stainless steel sheet according to the present invention, which includes the Ni and O-containing coating on the surface, is also suitable for use in applications in which a gap structure is formed. Such a gap structure may be formed when steel sheets overlap each other. Such a gap structure may be formed by welding.

EXAMPLES

Hereinafter, the present invention will be specifically described with reference to examples. The technical scope of the present invention is not limited to the examples described below.

A coating was applied by electrodeposition to each of the stainless steel sheets shown in Table 1. All the stainless steel sheets had a sheet thickness of 1.5 mm and a 2B surface finish (cold rolled, annealed and pickled, and skin pass rolled). The coating weight and the composition of the coating were as shown in Table 1. In some of the comparative examples, no electrodeposition was performed, as indicated by the coating weight of 0 g/m$^2$. The coating weight was determined by the weighing method. Next, the composition of the coating was determined based on the above-mentioned conditions for Auger electron spectroscopy. The contents of Ni and O are shown in Table 1.

In the examples shown in Table 1, except for Comparative Examples 1, 2, 3, and 6, electrodeposition was performed under the following conditions. An aqueous solution of nickel nitrate hexahydrate, having a temperature of 50° C. and a concentration of 30 g/l, was adjusted to a pH of 4 by using sulfuric acid, and an anode electrode made of iridium oxide-coated titanium and the stainless steel sheet were immersed in the solution. The stainless steel sheet was the cathode electrode. An electrical current of 1 A/dm² was applied to the solution. In this manner, the coating was obtained. The coating weight of the stainless steel sheet was adjusted in accordance with the duration of electrical current application.

In Comparative Example 6, electrodeposition was performed under the following conditions. An aqueous solution of 240 g/l of nickel nitrate hexahydrate and 30 g/l of boric acid, having a temperature of 50° C., was adjusted to a pH of 3.6 by using sulfuric acid, and an anode electrode made of iridium oxide-coated titanium and the stainless steel sheet were immersed in the solution. The stainless steel sheet was the cathode electrode. An electrical current of 1 A/dm² was applied to the solution for 188 seconds.

Steel sheets obtained from the above process were subjected to the tests described below.

their surfaces overlapping each other. In the CCT, 30 cycles were performed according to JASO M610 (cycle of salt spray at 35° C., 2 h→drying at 60° C., 4 h→exposure to humidity at 50° C., 2 h). With regard to the presence or absence of outflow rust, absence of outflow rust was evaluated as "pass" and presence of outflow rust was evaluated as "fail".

The results are shown in Table 1. Examples 1 to 9 exhibited excellent weld penetration characteristics and excellent crevice corrosion resistance. On the other hand, Comparative Examples 1 to 6, in each of which the coating weight or the composition of the coating was outside the preferred range of the present invention, exhibited insufficient weld penetration characteristics and/or insufficient crevice corrosion resistance.

TABLE 1

| No. | Steel grade | Coating weight (g/m²) | Duration of current application (s) | Composition of coating (at. %) | | Characteristics evaluation | |
|---|---|---|---|---|---|---|---|
| | | | | Ni | O | Penetration depth | Crevice corrosion occurrence |
| Example 1 | SUS304 | 0.1 | 1.7 | 30 | 40 | ○ | No |
| Example 2 | SUS430 | 1.5 | 19.1 | 35 | 55 | ○ | No |
| Example 3 | SUS430J1L | 1.1 | 14.1 | 33 | 51 | ○ | No |
| Example 4 | SUS430LX | 1.2 | 15.4 | 31 | 50 | ○ | No |
| Example 5 | SUS443J1 | 0.5 | 6.7 | 40 | 55 | ○ | No |
| Example 6 | SUS443J1 | 1.0 | 12.9 | 34 | 53 | ○ | No |
| Example 7 | SUS443J1 | 5.2 | 65.0 | 30 | 45 | ○ | No |
| Example 8 | SUS443J1 | 20.2 | 251 | 35 | 60 | ○ | No |
| Example 9 | SUS445J1 | 1.1 | 14.1 | 35 | 50 | ○ | No |
| Comparative example 1 | SUS304 | 0.0 | (No electrodeposition) | — | — | x | No |
| Comparative example 2 | SUS430 | 0.0 | (No electrodeposition) | — | — | x | Yes |
| Comparative example 3 | SUS443J1 | 0.0 | (No electrodeposition) | — | — | x | Yes |
| Comparative example 4 | SUS443J1 | 0.04 | 1.0 | 40 | 52 | x | Yes |
| Comparative example 5 | SUS430 | 25.3 | 314 | 35 | 57 | ○ | Yes |
| Comparative example 6 | SUS443J1 | 5.5 | 188 | 85 | 2 | x | Yes |

○: Back bead present over entire length
x: Back bead partially absent or absent over entire length (Weld Penetration Characteristics Test)
For evaluations of weld penetration characteristics, TIG welding was performed under the following conditions: no filler material; electrical current: 75 A; speed: 300 mm/minute; shielding gas: 100% Ar; shielding of 10 L/minute for the front side and no shielding for the back side. The welding was bead-on welding with a weld length of 200 mm. Determinations were made by observing whether a back bead was present over the entire welded length, in other words, whether the molten metal reached the back side. Bead-on welding is a type of welding that forms a bead on a single sheet, unlike those types of welding for two butted sheets, for example. Examples in which a back bead was present over the entire length were evaluated as ○ (pass), and examples in which a back bead was absent along at least part of the length were evaluated as x (fail).

(Crevice Corrosion Resistance Test)
Determinations of crevice corrosion resistance were made by conducting the following test. Specifically, two steel sheets of the same steel grade and having the same coating weight, with their coated surfaces overlapping each other, were subjected to spot welding so as to form a gap between the two steel sheets. A combined cycle corrosion test (CCT) was performed to determine the crevice corrosion resistance by the presence or absence of outflow rust from the gap. For those comparative examples that had a coating weight of 0 g/m², spot welding was performed on the steel sheets with As described above, the use of the present invention enables production of a stainless steel sheet having excellent weld penetration characteristics and excellent crevice corrosion resistance. The stainless steel sheet can be applied for a gap structure, for which stainless steel sheets in the related art cannot be easily applied. Thus, the present invention provides substantial industrial advantages.

The invention claimed is:

1. A stainless steel sheet comprising a Ni and O-containing coating on a surface of the stainless steel sheet,
   wherein the Ni and O-containing coating has a coating weight of greater than or equal to 0.1 g/m² and less than or equal to 20 g/m², and
   the Ni and O-containing coating has a composition including, in at. %, Ni: greater than or equal to 25% and less than or equal to 60%, and O: greater than or equal to 40% and less than or equal to 70%.

2. The stainless steel sheet according to claim 1, wherein the stainless steel sheet comprises a ferritic stainless steel sheet.

3. The stainless steel sheet according to claim 1, wherein the stainless steel sheet is used in an application in which a gap structure is formed.

4. The stainless steel sheet according to claim 2, wherein the stainless steel sheet is used in an application in which a gap structure is formed.

5. A method for producing the stainless steel sheet according to claim 1, the stainless steel sheet comprising the Ni and O-containing coating on the surface of the stainless steel sheet,
the method comprising performing electrodeposition to form the Ni and O-containing coating on the surface of the stainless steel sheet.

6. A method for producing the stainless steel sheet according to claim 2, the stainless steel sheet comprising the Ni and O-containing coating on the surface of the stainless steel sheet,
the method comprising performing electrodeposition to form the Ni and O-containing coating on the surface of the stainless steel sheet.

7. A method for producing the stainless steel sheet according to claim 3, the stainless steel sheet comprising the Ni and O-containing coating on the surface of the stainless steel sheet,
the method comprising performing electrodeposition to form the Ni and O-containing coating on the surface of the stainless steel sheet.

8. A method for producing the stainless steel sheet according to claim 4, the stainless steel sheet comprising the Ni and O-containing coating on the surface of the stainless steel sheet,
the method comprising performing electrodeposition to form the Ni and O-containing coating on the surface of the stainless steel sheet.

9. The method according to claim 5, for producing the stainless steel sheet comprising the Ni and O-containing coating on the surface of the stainless steel sheet, wherein the electrodeposition comprises cathode electrolysis in a solution containing nitrate ions and Ni ions.

10. The method according to claim 6, for producing the stainless steel sheet comprising the Ni and O-containing coating on the surface of the stainless steel sheet, wherein the electrodeposition comprises cathode electrolysis in a solution containing nitrate ions and Ni ions.

11. The method according to claim 7, for producing the stainless steel sheet comprising the Ni and O-containing coating on the surface of the stainless steel sheet, wherein the electrodeposition comprises cathode electrolysis in a solution containing nitrate ions and Ni ions.

12. The method according to claim 8, for producing the stainless steel sheet comprising the Ni and O-containing coating on the surface of the stainless steel sheet, wherein the electrodeposition comprises cathode electrolysis in a solution containing nitrate ions and Ni ions.

13. The stainless steel sheet according to claim 1, wherein the stainless steel sheet displayed absence of outflow rust after 30 cycles were performed according to JASO M610.

14. The stainless steel sheet according to claim 1, wherein the stainless steel sheet after undergoing a TIG welding under the following conditions: no filler material; electrical current: 75 A; speed: 300 mm/minute; shielding gas: 100% Ar; shielding of 10 L/minute for the front side and no shielding for the back side, displayed a back bead over an entire weld length of 200 mm.

* * * * *